United States Patent Office 2,735,470
Patented Feb. 21, 1956

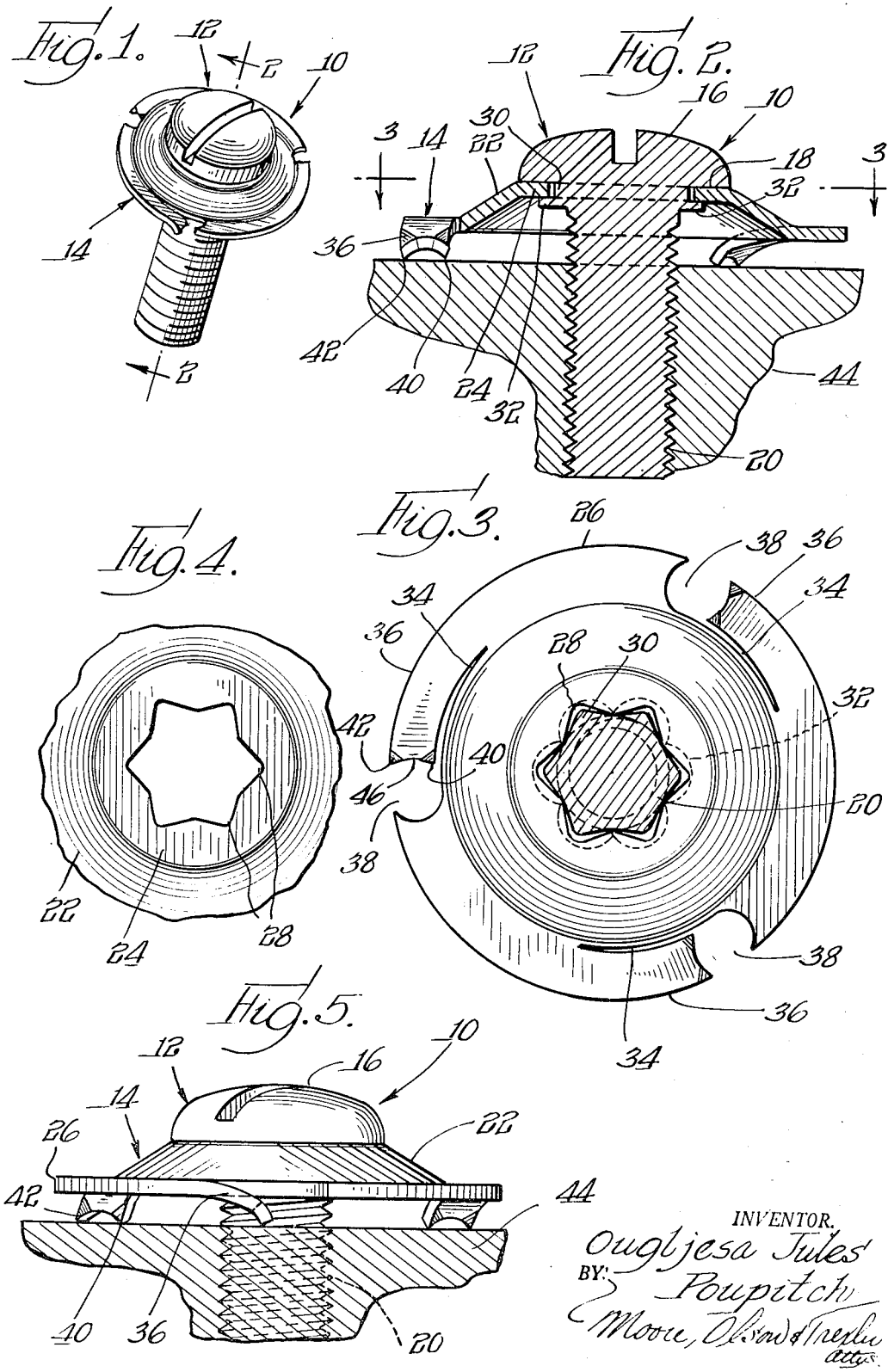

2,735,470

LOCK WASHER WITH BITING TEETH

Ougljesa Jules Poupitch, Itasca, Ill., assignor to Illinois Tool Works, Chicago, Ill., a corporation of Illinois Application January 12, 1953, Serial No. 330,738

4 Claims. (Cl. 151—37)

The present invention relates to rotary fastener devices, and more particularly to a novel lock washer especially adapted to be used with a threaded rotary fastener element such as a screw or a nut.

While many lock washers have been suggested by the prior art, these devices do not have sufficient holding power to be satisfactory in many instances. The present invention has for an object the provision of a novel lock washer and lock washer and screw assembly which has a substantially improved resistance to inadvertent or unauthorized retrograde movement when clamping against a work piece.

Another object of the present invention is to provide a novel lock washer and a novel lock washer and rotary fastener assembly constructed in a manner so that the holding power thereof is increased upon any retrograde movement of the washer.

Still another object of the present invention is to provide a novel lock washer of the above described type which provides firm, but yielding, locking engagement with a work piece and which is constructed so as to provide improved holding power without collapse of the yelding portions of the washer.

Still another object of the present invention is to provide a novel lock washer of the above described type which may be easily and economically formed by simple stamping and bending operations.

Other objects and advantages of the present invention will be apparent from the following description and the drawings, wherein:

Fig. 1 is a perspective view showing a rotary fastener assembly embodying the principles of this invention;

Fig. 2 is a vertical cross section taken along line 2—2 in Fig. 1 and showing the assembly threaded into a work piece;

Fig. 3 is a horizontal cross section taken along line 3—3 in Fig. 2;

Fig. 4 is a fragmentary plan view of the novel lock washer of this invention illustrating the shape of the central screw accommodating opening of the washer; and Fig. 5 is aside elevational view showing the novel rotary fastener assembly of this invention threaded into a work piece.

Referring now more specifically to the drawings, wherein like parts are designated by the same numerals throughout the various figures, a rotary fastener assembly 10 embodying the principles of this invention is shown best in Figs. 1, 2, and 5. The assembly 10 comprises a screw 12 and a lock washer 14.

The screw 12 may be constructed in any conventional manner. In the embodiment shown, the screw includes a head 16 having a radially extending work facing clamping surface 18 and a threaded shank 20.

The washer 14 includes a central generally dish-shaped or domed body section having a conical portion 22 and an inner substantially flat annular portion 24, as shown best in Fig. 2. An annular flange 26 of substantial width extends radially outwardly from the lower or outer margin of the generally conical portion 22. It should be noted that the annular flange 26 and the inner annular portion 24 of the washer are disposed in substantially parallel axially spaced planes.

Referring particularly to Fig. 4, it is seen that the inner marginal edge of the annular body portion 24 is serrated or notched, as at 28. These notches are adapted to receive and interengage with protuberances or splines 30 extending radially from the shank of the screw, as shown in Figs. 2 and 3. Preferably, after the washer has been assembly with the crew, the lower ends of the splines 30 are deformed to provide shoulders 32 engaging the under surface of the washer to hold the washer and screw in preassembled relationship. Because of the interengagement between the protuberances or the splines 30 and the notches 28, the washer and screw are held against relative rotation so that the locking action of the washer relative to the work piece fully described hereinbelow prevents retrograde movement of the screw.

As shown best in Fig. 3, the annular flange 26 of the washer is slit, as at 34, to provide a finger-like element 36 extending generally circumferencially of the washer. While in the embodiment shown, three finger-like elements 36 have been provided, it should be understood that this number of finger-like elements is given only by way of illustration. The annular flange 26 is cut away, as at 38, so that one end of the finger-like element 36 is free, while the other end is integrally connected with the flange. As shown best in Fig. 5, the finger-like element is curved so as to position the free end thereof axially outwardly of the plane of the flange 26. In addition, the free end portion of the finger-like element 36 is formed so that it has a substantially concave-convex cross section, as shown best in Fig. 2, whereby the radially spaced corners of the finger-like element are positioned axially outwardly away from the mid portion of the finger-like element to present relatively sharp radially spaced teeth 40 and 42. The finger-like elements 36 extend in the direction of retrograde movement of the screw so that the teeth 40 and 42 dig into the surface of a work piece 44 upon any retrograde movement of the assembly. Since the washer 14 is preferably constructed from resilient sheet material, such as spring steel, the finger-like elements 36 yield while the fastener is being tightened against the work piece to permit the teeth to slide over the work piece. It should be especially noted that the edge 46 of the free end of the finger-like element 36 is slightly concave. By reason of this structure, when retrograde relative movement takes place between the washer and the work piece, the teeth 40 and 42 dig into the surface of the work piece, and the concave edge 46 directs the material displaced from the work piece toward the mid portion of the edge 46 so that said displaced material forms an abutment of increasing size as the washer rotates for engagement with the mid portions of the end or edge 46, thereby materially increasing the resistance of the washer to further retrograde movement.

It should be noted that the slits 34 and the notches 38 are formed entirely within the annular flange 26 so that the generally dish-shaped or domed portion of the washer is uninterrupted. This is important since it has been found that any interruption of the conical portion 22 of the washer substantially weakens the conical portion so that the washer collapses under substantial clamping forces applied by the screw, thereby reducing the locking efficiency of the assembly.

From the above description, it is seen that the present invention has provided a novel lock washer which may be firmly, but slightly yieldably, clamped against a work piece and which has increased holding power upon any retrograde movement. Furthermore, it is seen that the novel locking teeth of the washer of this invention are formed without reducing the strength of the central generally dish-shaped body section of the washer. Furthermore, it is seen that the present invention has provided a washer which because of its simple structure may be easily and economically manufactured.

While the preferred embodiment of the present invention has been shown and described herein, it is obvious that many changes may be made without departing from the spirit and scope of the appended claims.

I claim:

1. A rotary fastener assembly, comprising a threaded rotary fastener element adapted to cooperate with a complementary threaded element, and a locking device comprising a generally annular sheet material body member, said body member including a centrally uninterrupted generally frusto-conical body section and a substantially flat radial flange integral with the outer margin of said frusto-conical body section, positively interlocking means on said body member and said fastener element preventing relative rotation in opposite directions between said body member and said threaded rotary fastener element, generally circumferentially extending finger-like elements struck entirely from within said flange and each having one end integral with said body member and having a free end extending generally circumferentially of said body member, said free ends of said finger-like elements being disposed axially outwardly of said body member and having radially extending concave terminal edges, and substantially only said free ends having concavo-convex radial cross sections with their concave sides facing generally away from said body member so that the corners at opposite ends of said concave terminal edges provide spaced teeth portions projecting axially outwardly for engagement with a workpiece.

2. A locking device including an uninterrupted frusto-conical annular body section, means at the inner margin of said body section for positively interlocking with complementary means on an associated rotary fastener element for locking the body section and the fastener element against relative rotation in opposite directions, a peripheral flange extending radially from the outer margin of said body section, generally circumferentially extending finger-like elements integral with and struck from said flange, said finger-like elements having free end portions disposed axially outwardly from said flange and away from said body section and generally radially extending concave terminal edges, the free ends of the said finger-like elements having substantially concavo-convex radial cross section with their concave sides facing away from the flange to present radially spaced corner portions extending axially outwardly from the remainder of the finger-like elements and at a greater angle with respect to said flange than the remainder of said finger-like elements to provide workpiece engaging teeth.

3. A locking device as claimed in claim 2, wherein the means at the inner margins of the body section for interlocking with complemental means on an associated rotary fastener element comprises a flange extending inwardly from the adjacent small end of the frusto-conical annular body section.

4. A locking device including an uninterrupted frusto-conical annular body section, means at the inner margin of said body section for positively interlocking with complementary means on an associated rotary fastener element for locking the body section and the fastener element against relative rotation in opposite directions, a peripheral flange extending radially from the outer margin of said body section, generally circumferentially extending finger-like elements integral with and struck from said flange, said finger-like elements having free end portions disposed axially outwardly from said flange and away from said body section and having concave terminal edges disposed along lines traversing said body section and facing generally in the direction of relative retrograde movement between the locking device and a workpiece to direct displaced material as an abutment toward the mid-portion of the concave terminal edges, and substantially only the free end portions of said finger-like elements having concavo-convex cross sections with their concave sides facing generally away from said flange so that the corners at opposite ends of said concave terminal edges provide spaced teeth projecting axially outwardly for engagement with a workpiece.

References Cited in the file of this patent

UNITED STATES PATENTS

| 1,323,188 | Humphris | Nov. 25, 1919 |
| 1,926,917 | Rosenberg | Sept. 12, 1933 |
| 2,270,813 | Olson | Jan. 20, 1942 |
| 2,297,957 | Hanneman | Oct. 6, 1942 |
| 2,619,146 | Poupitch | Nov. 25, 1952 |